Patented Apr. 4, 1944

2,346,048

UNITED STATES PATENT OFFICE 2,346,048

METHOD OF PRODUCING DIALKOXY STILBENES

Ewald Rohrmann, Indianapolis, Ind., assignor to Eli Lilly and Company, Indianapolis, Ind., a corporation of Indiana No Drawing. Application February 13, 1941, Serial No. 378,775

12 Claims. (Cl. 260—613)

This invention relates to stilbenes and more particularly to methods of producing dialkoxy stilbenes.

Many stilbenes possess marked estrogenic activity, but the "trans" forms of the stilbenes having this activity have been found to have substantially more estrogenic activity than the "cis" forms. For example, the "trans" form of 4:4'-dihydroxy-$\alpha$:$\beta$-diethyl stilbene, known as stilbesterol, has about ten times the activity of the "cis" form of 4:4'-dihydroxy-$\alpha$:$\beta$-diethyl stilbene. In the preparation of these estrogenically active stilbenes synthetically, approximately equal quantities of the "trans" and "cis" forms are produced and various methods have been proposed for separating the "trans" from the "cis" form. The methods now in use for this separation utilize differences in physical properties between the "trans" and the "cis" form. These methods, however, involve considerable manipulation and produce but fair yields.

In accordance with this invention the "trans" form of the dialkoxy derivative of the desired stilbene is produced in good yields. These dialkoxy stilbene derivatives can be readily converted to the desired stilbene.

The method in accordance with this invention is as follows:

Boron trichloride or boron trifluoride, or reactive complexes of boron trichloride or boron trifluoride, are reacted with a composition which is dissolved in a solvent and which is represented by the following formula:

(1) 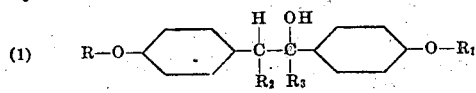

in which R is a radical selected from the class consisting of alkyl radicals, alkaryl radicals, acyl radicals, aracyl radicals, and substituted aracyl radicals in which the substituent is selected from the class consisting of the halogens and nitro groups; $R_1$ is a radical selected from the class consisting of alkyl radicals, alkaryl radicals, acyl radicals, aracyl radicals, and substituted aracyl radicals in which the substituent is selected from the class consisting of the halogens and nitro groups; $R_2$ is a member selected from the class consisting of alkyl radicals, aryl radicals, alkaryl radicals, cycloalkyl radicals, and substituted alkyl, aryl, alkaryl, and cycloalkyl radicals containing at least one alkoxy group; and $R_3$ is a member selected from the class consisting of alkyl radicals, aryl radicals, alkaryl radicals, cycloalkyl radicals, and substituted alkyl, aryl, alkaryl, and cyclo-alkyl radicals containing at least one alkoxy group.

Preferably the composition, the structure of which is shown in Formula 1, is reacted with boron trifluoride or the reactive complex of boron trifluoride and, desirably, the reactive complexes of the halides are used instead of the halides themselves. When a reactive complex is used, the solvent for the composition is not essential, although it is preferred to have such a solvent. Examples of solvents which may be used for this purpose are benzene, toluene, xylene, carbon tetrachloride, chloroform, diethyl-ether, di-isopropyl ether, di-n-butyl ether, and o-, p-, or m-methylcyclohexane. The solvent used may be one that is inert to the boron halide or one that does not react with the boron halide to decompose that halide. The reactive complexes are formed from the respective halides with an organic compound and these reactive complexes react like the halide from which they are derived. Examples of organic compounds which may be reacted with either boron trichloride or boron trifluoride to produce reactive complexes which react like the halide from which they are derived are: liquid alkyl ethers, such as diethyl ether, diisopropyl ether, and di-n-propyl ether; liquid alkyl monocarboxylic acid, such as acetic acid, propionic acid, and butyric acid; ethylene and methanol.

The reaction between the composition shown in Formula 1 and the boron trichloride or boron trifluoride or the reactive complexes of either of these halides is maintained between 10° C. and 100° C. and preferably between 10° C. and 30° C. Desirably, the quantity of the boron trichloride or boron trifluoride employed may be between 50 and 300 percent by weight of the composition treated. If the reactive complex of either boron trichloride or boron trifluoride is used, preferably the amount of complex employed is such that the boron halide content is between 50 and 300 percent by weight of the composition treated. The reaction which takes place may be represented by the following equation:

(2) 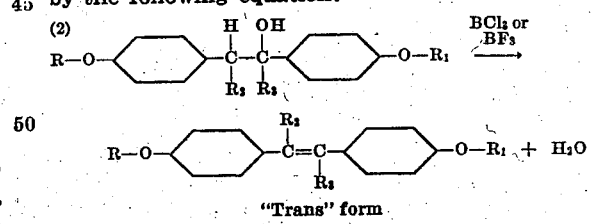

"Trans" form

Preferably, when either or both R and $R_1$ are alkyl radicals or acyl radicals, the number of carbon atoms of each alkyl or acyl radical does not exceed three and, preferably, when either or both R and $R_1$ are alkaryl radicals, aracyl radicals or substituted aracyl radicals, each alkaryl, aracyl, or substituted aracyl radical is the benzyl, benzoyl, or substituted benzoyl radical respectively. For example, desirably, either or both $R_1$ and $R_2$ are the methyl, ethyl, propyl, isopropyl, acetyl, propionyl, o-chlorobenzoyl, or p-nitrobenzoyl radicals. However, either or both R and $R_1$ may be other alkyl or acyl radicals, such as the n-butyl, isoamyl, decyl, or capryl radical. Likewise, either or both R and $R_1$ may be alkaryl, aracyl, or substituted aracyl radicals other than the benzyl, benzoyl, or substituted benzoyl radical, such as β-phenethyl

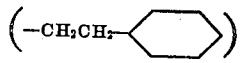

mesityl

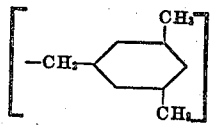

phenylacetyl or p-chlorophenylpropionyl.

When either or both $R_2$ and $R_3$ are alkyl or cycloalkyl radicals, or substituted alkyl or cycloalkyl radicals, each of these radicals preferably contains less than eight carbon atoms. Examples of such radicals are propyl, n-amyl, cyclopentyl, cyclohexyl, and 4-methoxycyclohexyl.

When either or both $R_2$ and $R_3$ are aryl or alkaryl radicals or substituted aryl or alkaryl radicals, each of these radicals preferably contains less than eight carbon atoms. Examples of such radicals are phenyl, o-tolyl, benzyl, p-chlorophenyl, m-methoxyphenyl, and p-methoxybenzyl.

The period of reaction is dependent upon the temperature of the reaction mixture. A period between two to fourteen days has been found satisfactory. When the temperature is maintained at between 20° and 30° C. a period of from five to seven days is satisfactory. Substantially all of the reaction product formed is in the "trans" form. The dialkoxy stilbene is separated from the reaction mixture by any suitable means, such as adding water to the mixture to decompose the boron halide, separating the water containing the decomposition products of the halide, and distilling the solvent from the non-water miscible layer.

Alternately, the "cis" form of a dialkoxy stilbene may be converted into the "trans" form by reacting the "cis" form of the dialkoxy stilbene with boron trichloride, boron trifluoride, or a reactive complex of either of these halides. In this case, desirably the quantity of the boron trichloride or boron trifluoride employed may be between 5 and 200 percent by weight of the composition treated. If the reactive complex of either boron trichloride or boron trifluoride is used, preferably the amount of complex employed is such that the boron halide content is between 5 and 200 percent by weight of the composition treated. The period of heating and the procedure followed are the same as those in the formation of the dialkoxy stilbene from the composition represented in Formula 1. R, $R_1$, $R_2$, and $R_3$ are preferably of low molecular weight as heretofore described for the composition represented in Formula 1. The reaction which takes place in the conversion of the "cis" form to the "trans" form may be represented by the following equation:

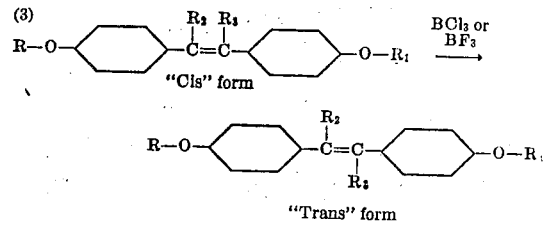

Typical examples of the methods of this invention are as follows:

EXAMPLE 1.—*Preparation of the "trans" form of 4:4'-dimethoxy-α:β-diethyl stilbene*

To a solution, maintained at approximately 10° C., of 200 g. of 3:4-di-(p-methoxyphenyl)-hexane-3-ol in 800 cc. of pure carbon tetrachloride are added with shaking 800 g. of boron trifluoride-ethyl ether reactive complex. This boron trifluoride-ethyl ether reactive complex is prepared by saturating ethyl ether with boron trifluoride gas. The reaction mixture of the 3:4-di-(p-methoxyphenyl)-hexane-3-ol and boron trifluoride-ethyl ether complex is allowed to stand at 20°–25° C. for six days. Water is added and the carbon tetrachloride and ether layer, which contains the desired product, is thoroughly washed with water. The carbon tetrachloride and ether are distilled off and the residual syrup which solidifies on cooling is distilled at a pressure of 0.5 mm. The desired product is crystallized from the distillate with 1:5 acetone-petroleum ether (B. P. 30°–60° C.). The product, which is the "trans" form of 4:4'-dimethoxy-α:β-diethyl stilbene, has a melting point of 122°–124° C., uncorrected, and may be represented by the following formula:

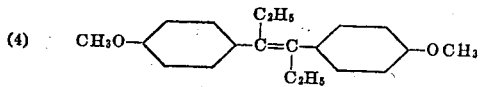

EXAMPLE 2.—*Preparation of the "trans" form of 4:4'dimethoxy-α:β-diethyl stilbene*

To a solution, maintained at approximately 10° C., of 100 g. of liquid cis-4:4'-dimethoxy-α:β-diethyl stilbene are carefully added with shaking 150 g. of boron fluoride-ethyl ether reactive complex. The red colored solution is allowed to stand for six days at 20°–25° C. The crystalline material which separates is filtered and washed with carbon tetrachloride. The product is crystallized from 1:5 acetone-petroleum ether (B. P. 30°–60° C.) to give white crystals of trans-4:4'-dimethoxy-α:β-diethyl stilbene. The product has a melting point of 122°–124° C., uncorrected.

By treating the carbon tetrachloride-ether solution in the filtrate as described in Example 1, a further quantity of material is obtained.

EXAMPLE 3.—*Preparation of the "trans" form of 4:4'-diacetoxy-α:β-diethyl stilbene*

To a solution, maintained at approximately 10° C., of 10 g. of 3:4-di-(p-acetoxyphenyl)-hexane-3-ol in 40 cc. of dry carbon tetrachloride are added with shaking 40 g. of boron trifluoride-ethyl ether reactive complex. The red colored solution is allowed to stand at 20°–25° C. for six days. Water is added and the carbon tetrachloride ether layer is thoroughly washed with water. The carbon tetrachloride and ether are removed and the residual product is distilled at a pressure of 0.5 mm. The desired product is crystallized from the distillate with 1:5 acetone-petroleum ether (B. P. 30°–60° C.) to give white crystals of "trans" 4:4'-diacetoxy-α:β-diethyl stilbene. The product has a melting point of 122°–124° C. and may be represented by the following formula:

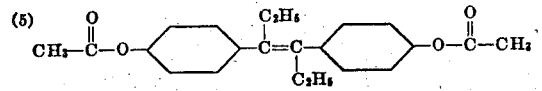

EXAMPLE 4.—*Preparation of the "trans" form of 4:4'-dibenzoyloxy-α:β-diethyl stilbene*

To a solution, maintained at approximately 10° C., of 10 g. of 3:4-di-(p-benzoyloxyphenyl)-hexane-3-ol in 40 cc. of dry carbon tetrachloride are added with shaking 40 g. of boron fluoride-ethyl ether reactive complex. The red colored solution is allowed to stand at 20°–25° C. for six days. Water is added and the carbon tetrachloride-ether layer is thoroughly washed with water. The carbon tetrachloride and ether are removed and the residual material is dissolved in acetone and filtered through decolorizing carbon. The product is crystallized from 1:3 acetone-petroleum ether (B. P. 30°–60° C.) to give white crystals of trans 4:4'-dibenzoyloxy-α:β-diethyl stilbene. The product has a melting point of 208°–210° C., uncorrected, and may be represented by the following formula:

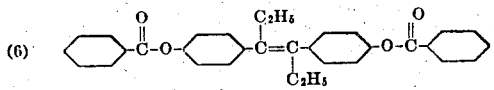

EXAMPLE 5.—*Preparation of the "trans" form of 4:4'-dimethoxy-α:β-dimethyl stilbene*

To a solution, maintained at approximately 10° C., of 25 g. of 2:3-di-(p-methoxyphenyl)-butane-2-ol in 100 cc. of dry carbon tetrachloride are added with shaking 100 g. of boron fluoride-ethyl ether reactive complex. The red colored solution is allowed to stand at 20°–25° C. for six days. Water is added and the carbon tetrachloride-ether layer is thoroughly washed with water. The carbon tetrachloride and ether are distilled off and the residual material is distilled at a pressure of 0.5 mm. The desired product is crystallized from the distillate with 1:5 acetone-petroleum ether (B. P. 30°–60° C.) to give white crystals of trans 4:4'-dimethoxy-α:β-dimethyl stilbene. The product has a melting point of 128°–130° C. and may be represented by the following formula:

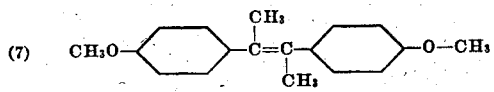

EXAMPLE 6.—*Preparation of the "trans" form of 4:4'-dimethoxy-α:β-diethyl stilbene*

To a solution of 25 g. of 3:4-di-(p-methoxyphenyl)-hexane-3-ol in 100 cc. of pure carbon tetrachloride are added with shaking 100 g. of boron fluoride-ethyl ether reactive complex. The red colored solution is warmed on the steam bath and the solvent is allowed to evaporate off over a period of one hour. The residual product is dissolved in 100 cc. of carbon tetrachloride and the solution is thoroughly washed with water. The solvent is distilled off and the reaction product is distilled at a pressure of 0.5 mm. The trans 4:4'-dimethoxy-α:β-diethyl stilbene is crystallized from the distillate with 1:5 acetone-petroleum ether (B. P. 30°–60° C.). The product has a melting point of 122°–124° C.

EXAMPLE 7.—*Preparation of the "trans" form of 4:4'-dimethoxy-α:β-diethyl silbene*

To a solution, maintained at approximately 10° C., of 50 g. of 3:4-di-(p-methoxyphenyl)-hexane-3-ol in 200 cc. of pure carbon tetrachloride are added with shaking 200 g. of boron chloride-ethyl ether reactive complex which is prepared by saturating ethyl ether with boron chloride gas. The reaction mixture containing the 3:4-di-(p-methoxyphenyl)-hexane-3-ol is allowed to stand at 20° C. for 6 days. Water is added and the carbon tetrachloride-ether layer is thoroughly washed with water. The carbon tetrachloride and ether are distilled off and the residual product is distilled at a pressure of 0.5 mm. The trans 4:4'-dimethoxy-α:β-diethyl stilbene is crystallized from the distillate with 1:5 acetone-petroleum ether (B. P. 30°–60°). The product has a melting point of 122°–124° C.

EXAMPLE 8.—*Preparation of the "trans" form of 4:4'-methoxy-α:β-diethyl stilbene*

To a solution, maintained at approximately 10° C., of 3:4-di-(p-methoxyphenyl)-hexane-3-ol in 400 cc. of pure carbon tetrachloride are added with shaking 400 g. of boron fluoride-isopropyl ether, which is prepared by saturating isopropyl ether with boron trifluoride gas. The reaction mixture containing 3:4-di-(p-methoxyphenyl)-hexane-3-ol is allowed to stand at 20° C. for six days. Water is added and the carbon tetrachloride-isopropyl ether layer is thoroughly washed with water. The solvent is distilled off and the residual product is distilled at a pressure of 0.5 mm. The trans 4:4'-dimethoxy-α:β-diethyl stilbene is crystallized from the distillate with 1:5 acetone-petroleum ether (B. P. 30°–60° C.). The product has a melting point of 122°–124° C.

EXAMPLE 9.—*Preparation of the "trans" form of 4:4'-dimethoxy-α—ethyl-β-methyl stilbene*

To a solution, maintained at approximately 10° C., of 50 g. of 3:4-di-(p-methoxyphenyl)-pentane-3-ol in 200 cc. of pure carbon tetrachloride are added with shaking 200 g. of boron trifluoride-ethyl ether reactive complex. The reaction mixture is allowed to stand for six days at 20°–25° C. Water is added and the carbon tetrachloride-ether layer is thoroughly washed with water. The carbon tetrachloride and ether are distilled off and the residual product is distilled at a pressure of 0.3 mm. The product is a liquid having a boiling point of 173°–176° at 0.3 mm. pressure. The product may be represented by the following formula:

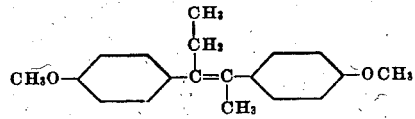

EXAMPLE 10.—*Preparation of the "trans" form of 4:4'-dimethoxy-α:β-di-n-butyl stilbene*

To a solution, maintained at approximately 10° C., of 25 g. of 5:6-di-(p-methoxyphenyl)-decane-5-ol in 100 cc. of pure carbon tetrachloride are added with shaking 100 g. of boron trifluoride-ethyl ether reactive complex. The reaction mixture is allowed to stand for five days at 20°–25° C. Water is added and the carbon tetrachloride-ether layer is thoroughly washed with water. The carbon tetrachloride and ether are distilled off and the residual product is distilled at a pressure of .25 mm. The product is a liquid having a boiling point of 191°–193° at 0.25 mm. pressure. The product may be represented by the following formula:

(9)

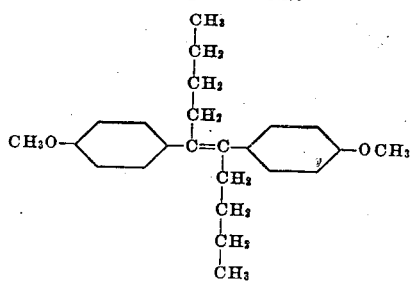

What is claimed is:

1. The method of producing a disubstituted stilbene of predominantly "trans" form, which comprises subjecting to the presence of a halide selected from the class consisting of boron trichloride, boron trifluoride, the reactive complex of boron trichloride, and the reactive complex of boron trifluoride, a composition represented by the following formula:

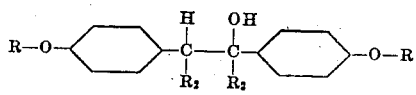

in which R in each case is a radical selected from the class consisting of alkyl radicals, aliphatic carboxylic acyl radicals, and aracyl radicals, and $R_2$ in each case is an alkyl radical.

2. The method of producing a disubstituted stilbene of predominantly "trans" form, which comprises subjecting to the presence of a halide selected from the class consisting of boron trichloride, boron trifluoride, the reactive complex of boron trichloride, and the reactive complex of boron trifluoride, in a solvent, at a temperature between 10° C. and 100° C., a composition represented by the following formula:

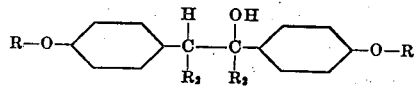

in which R in each case is a radical selected from the class consisting of alkyl radicals, aliphatic carboxylic acyl radicals, and aracyl radicals, and $R_2$ in each case is an alkyl radical.

3. The method of producing a disubstituted stilbene of predominantly "trans" form, which comprises subjecting to the presence of a halide selected from the class consisting of boron trichloride, boron trifluoride, the reactive complex of boron trichloride, and the reactive complex of boron trifluoride, in a solvent, at a temperature between 10° C. and 30° C., a composition represented by the following formula:

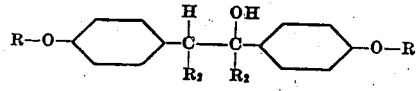

in which R in each case is a radical selected from the class consisting of alkyl radicals, aliphatic carboxylic acyl radicals, and aracyl radicals, and $R_2$ in each case is an alkyl radical.

4. The method of producing a disubstituted stilbene in predominantly "trans" form in accordance with claim 1, in which R is the methyl radical and $R_2$ is an alkyl radical.

5. The method of producing a disubstituted stilbene in the "trans" form, which comprises subjecting to the presence of a halide selected from the class consisting of boron trichloride, boron trifluoride, the reactive complex of boron trichloride, and the reactive complex of boron trifluoride, in a solvent, a composition in the "cis" form which is represented by the following formula:

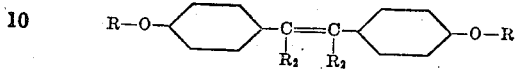

in which R in each case is a radical selected from the class consisting of alkyl radicals, aliphatic carboxylic acyl radicals, and aracyl radicals, and $R_2$ in each case is an alkyl radical.

6. The method of producing a disubstituted stilbene in the "trans" form, which comprises subjecting to the presence of a halide selected from the class consisting of boron trichloride, boron trifluoride, the reactive complex of boron trichloride, and the reactive complex of boron trifluoride, in a solvent, at a temperature between 10° C. and 100° C., a composition in the "cis" form which is represented by the following formula:

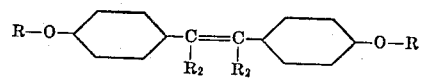

in which R in each case is a radical selected from the class consisting of alkyl radicals, aliphatic carboxylic acyl radicals, and aracyl radicals, and $R_2$ in each case is an alkyl radical.

7. The method of producing a disubstituted stilbene in the "trans" form, which comprises subjecting to the presence of a halide selected from the class consisting of boron trichloride, boron trifluoride, the reactive complex of boron trichloride, and the reactive complex of boron trifluoride in a solvent, at a temperature between 10° C. and 30° C., a composition in the "cis" form which is represented by the following formula:

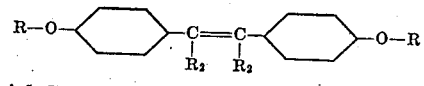

in which R in each case is a radical selected from the class consisting of alkyl radicals, aliphatic carboxylic acyl radicals, and aracyl radicals, and $R_2$ in each case is an alkyl radical.

8. The method of producing the "trans" form of 4:4'-dimethoxy-α,β-diethyl stilbene, which comprises subjecting the "cis" form of 4:4'-dimethoxy-α,β-diethyl stilbene, in a solvent, to the presence of boron trifluoride.

9. The method of producing 4:4'-dimethoxy-α,β-diethyl stilbene in predominantly "trans" form, which comprises subjecting 3:4-di(p-methoxyphenyl)hexane-3-ol, in a solvent, to the presence of boron trifluoride.

10. The method of producing a disubstituted stilbene in predominantly "trans" form, which comprises subjecting to the presence of a halide selected from the class consisting of boron trichloride, boron trifluoride, the reactive complex of boron trichloride, and the reactive complex of boron trifluoride, in a solvent, a composition represented by the following formula:

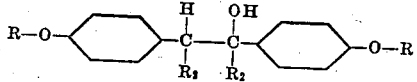

in which R in each case is a radical selected from the class consisting of alkyl radicals, aliphatic carboxylic acyl radicals, and aracyl radicals, and R₂ in each case is an alkyl radical.

11. The method of producing a disubstituted stilbene in accordance with claim 1, in predominantly "trans" form in which the boron halide content of the halide employed is between 50 and 300 percent by weight of the composition treated.

12. The method of producing a disubstituted stilbene in the "trans" form in accordance with claim 5, in which the boron halide content of the halide employed is between 5 and 200 percent by weight of the composition treated.

EWALD ROHRMANN.